US012576878B2

(12) United States Patent (10) Patent No.: US 12,576,878 B2
Lu et al. (45) Date of Patent: Mar. 17, 2026

(54) AUTONOMOUS VEHICLE TRAFFIC MANAGEMENT

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/180,189

(22) Filed: Mar. 8, 2023

(65) Prior Publication Data

US 2024/0300520 A1 Sep. 12, 2024

(51) Int. Cl.
*B60W 60/00* (2020.01)
*B60W 30/16* (2020.01)
(Continued)

(52) U.S. Cl.
CPC .......... *B60W 60/001* (2020.02); *B60W 30/16* (2013.01); *B60W 40/08* (2013.01);
(Continued)

(58) Field of Classification Search
CPC .... B60W 60/001; B60W 30/16; B60W 40/08; B60W 2555/00; B60W 2554/80; B60W 2040/0872; G08G 1/09
See application file for complete search history.

(56) References Cited

U.S. PATENT DOCUMENTS

| 10,753,754 | B2 | 8/2020 | Delizio | |
| 2014/0052344 | A1* | 2/2014 | Tsuda | B60H 1/00771 |
| | | | | 701/96 |

(Continued)

FOREIGN PATENT DOCUMENTS

| EP | 3945478 A1 | 2/2022 |
| JP | 2020173836 A | * 10/2020 |

OTHER PUBLICATIONS

California Law Revision Commission: Sovereign Immunity, Jan. 1963 (Year: 1963).*

(Continued)

*Primary Examiner* — Navid Z. Mehdizadeh
*Assistant Examiner* — Oliver Tan
(74) *Attorney, Agent, or Firm* — Aaron N. Pontikos

(57) ABSTRACT

In an approach to autonomous vehicle traffic management, one or more computer processors retrieve an identification associated with a first autonomous vehicle. One or more computer processors retrieve a distance rule corresponding to the first autonomous vehicle from a smart contract, wherein the distance rule is a rule for a minimum distance that other autonomous vehicles must maintain with respect to the first autonomous vehicle. One or more computer processors determine a context of the first autonomous vehicle. Based on the context of the first autonomous vehicle, one or more computer processors determine whether a first exception to the distance rule is required. One or more computer processors generate the first exception to the distance rule. One or more computer processors communicate the distance rule and the first exception to the distance rule to one or more additional autonomous vehicles traveling in proximity to the first autonomous vehicle.

18 Claims, 3 Drawing Sheets

(51) Int. Cl.
  *B60W 40/08* (2012.01)
  *G08G 1/09* (2006.01)

(52) U.S. Cl.
  CPC ....... *G08G 1/09* (2013.01); *B60W 2040/0872* (2013.01); *B60W 2554/80* (2020.02); *B60W 2555/00* (2020.02)

(56) References Cited

U.S. PATENT DOCUMENTS

| | | | |
|---|---|---|---|
| 2019/0049994 A1* | 2/2019 | Pohl | G08G 1/166 |
| 2019/0072968 A1* | 3/2019 | Will, IV | G06N 3/006 |
| 2020/0033887 A1* | 1/2020 | Kim | H04W 12/10 |
| 2020/0074061 A1 | 3/2020 | Kim | |
| 2020/0257292 A1* | 8/2020 | Zhao | B60Q 9/00 |
| 2020/0384997 A1* | 12/2020 | Lacaze | B60W 30/165 |
| 2021/0044969 A1 | 2/2021 | Cronie | |
| 2022/0161815 A1 | 5/2022 | Van Beek | |
| 2022/0289248 A1 | 9/2022 | Niewiadomski | |
| 2023/0382394 A1* | 11/2023 | Roberts | H04M 1/72454 |

OTHER PUBLICATIONS

CA DMV Driver's Handbook 2019 (Year: 2019).*

JP2020173836A machine translation (Year: 2020).*

Jain et al., "Blockchain and Autonomous Vehicles: Recent Advances and Future Directions", IEEE Access, vol. 9, Sep. 17, 2021, 65 Pages.

McLellan, Charles, "What is V2X communication? Creating connectivity for the autonomous car era", ZDNET Special Feature: Autonomous Vehicles and the Enterprise, Nov. 4, 2019, 15 Pages.

Purkayastha, Shyam, "Smart Traffic Management System for Emergency Services", IBM Cloud Blog, Nov. 19, 2015, 6 Pages.

Unknown, "IBM IoT Connected Vehicle Insights", Retrieved from: https://web.archive.org/web/20201128110143/ https://www.ibm.com/products/iot-for-automotive, Retrieved on: Nov. 28, 2020, 6 pages.

Unknown, "Smart city technology revolutionizes infrastructure", Retrieved from: https://web.archive.org/web/20220701210855/https://www.ibm.com/industries/government/infrastructure-citizen-services, Retrieved on: Jul. 1, 2022, 6 pages.

* cited by examiner

300

AUTONOMOUS VEHICLE TRAFFIC MANAGEMENT

BACKGROUND OF THE INVENTION

The present invention relates generally to the field of smart traffic infrastructure, and more particularly to autonomous vehicle traffic management.

Autonomous vehicles are vehicles capable of sensing their environment and navigating without human input. Autonomous vehicles can include terrain-based vehicles (e.g., cars), watercraft, hovercraft, and aircraft. Autonomous vehicles can detect surroundings using a variety of techniques such as radar, lidar, global positioning system (GPS), odometry, and computer vision. Land-based autonomous vehicle guidance systems interpret sensory information to identify appropriate navigation paths, obstacles, and relevant signage. Land-based autonomous vehicles have control systems that can analyze sensory data to distinguish between different cars on the road and guide themselves to desired destinations. Among the potential benefits of autonomous vehicles (e.g., autonomous cars) are fewer traffic accidents, increased roadway capacity, reduced traffic congestion, and enhanced mobility for people. Autonomous cars can also relieve travelers from driving and navigation chores, freeing commuting hours with more time for leisure or work.

A blockchain is a decentralized and distributed digital ledger that can record transactions between two or more parties efficiently and in a verifiable and permanent way. The ledger itself can also be programmed to trigger transactions automatically. A blockchain maintains a continuously growing list of records, called blocks, secured from tampering and revision. Each block contains a timestamp and a link to a previous block. By design, blockchains are inherently resistant to modification of the data—once recorded, the data in a block cannot be altered retroactively. Using a peer-to-peer network and a distributed timestamping server, a blockchain database is managed autonomously. The decentralized consensus algorithm of blockchain technologies allows several entities to maintain a shared record of information without having to trust each other individually, since consensus is formed on a per-network basis. The networked model produces a system with the advantages of censorship resistance, tamper resistance, and a system with no single point of failure.

Smart contracts are computer programs that both express the contents of a contractual agreement and operate the implementation of the content, based on triggers provided by users of a smart contract or extracted from a blockchain environment. Smart contracts may have a user interface and often emulate the logic of contractual clauses. Smart contracts aim to provide security superior to traditional contract law and to reduce other transaction costs associated with contracting. Within the context of blockchain, smart contracts are scripts stored on the blockchain. Since they reside on the chain, smart contracts have a unique address. A smart contract is triggered by messages or transactions sent to its address.

The Internet of Things (IoT) is the inter-networking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

SUMMARY

Embodiments of the present invention disclose a computer-implemented method, a computer program product, and a system for autonomous vehicle traffic management. The computer-implemented method may include one or more computer processors retrieving an identification associated with a first autonomous vehicle. One or more computer processors retrieve a distance rule corresponding to the first autonomous vehicle from a smart contract, wherein the distance rule is a rule for a minimum distance that other autonomous vehicles must maintain with respect to the first autonomous vehicle. One or more computer processors determine a context of the first autonomous vehicle. Based on the context of the first autonomous vehicle, one or more computer processors determine whether a first exception to the distance rule is required. Responsive to determining the first exception to the distance rule is required, one or more computer, generate the first exception to the distance rule. One or more computer processors communicate the distance rule and the first exception to the distance rule to one or more additional autonomous vehicles traveling in proximity to the first autonomous vehicle.

DETAILED DESCRIPTION

The future of transportation will include autonomous vehicles. Autonomous vehicles may make driving decisions by capturing data from the surrounding area and/or communicating with other vehicles. While autonomous vehicles are traveling on a route, various traffic rules and special case scenarios may be in place. For example, public vehicles may be required to maintain a sufficient gap from other vehicles for security purposes. In another example, any vehicle transporting fuel may be required to maintain sufficient distance from other vehicles. Thus, there can be different contextual scenarios where travel distance rules regarding maintaining a required distance from other vehicles apply, as well as allowable exceptions to the rules. Although the basis of the present invention will be discussed with respect to autonomous cars, embodiments of the present invention may also be implemented in other types of autonomous vehicles, such as other autonomous terrain-based vehicles (e.g., buses), watercraft, hovercraft, aircraft, etc.

Embodiments of the present invention recognize that improvements to traffic management of autonomous vehicles may be made by communicating dynamic rules and/or exceptions to the autonomous vehicles while the vehicles are on a route. Embodiments of the present invention also recognize that personal safety of users in and/or around autonomous vehicles may be improved by ensuring safe distances relative to positions of other vehicles. Embodiments of the present invention also recognize that improvements to vehicle security may be made by utilizing a smart contract on a blockchain ledger to store and track the dynamic rules and exceptions. Implementation of embodiments of the invention may take a variety of forms, and exemplary implementation details are discussed subsequently with reference to the Figures.

Figure 1:
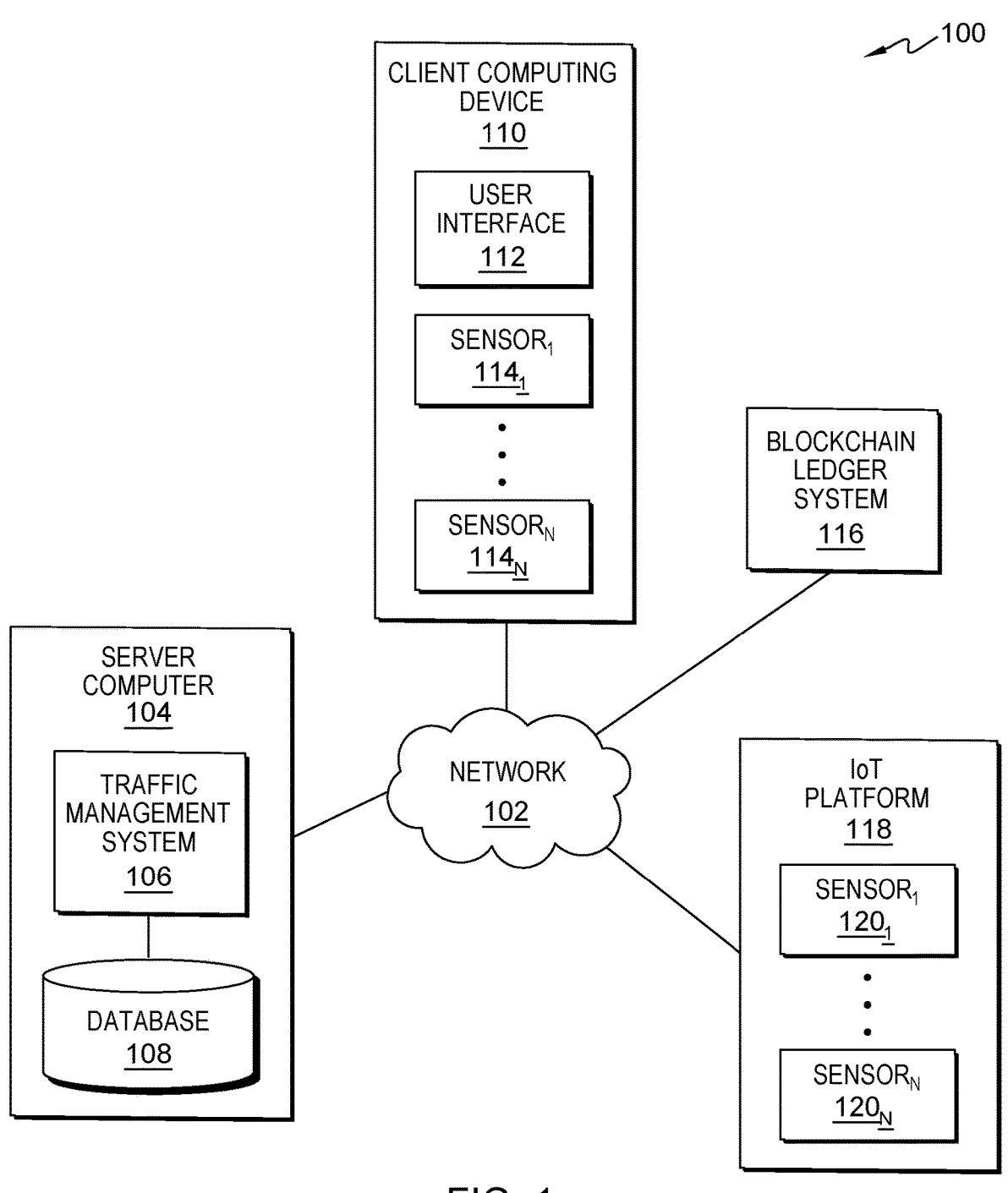
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 110, blockchain ledger system 116, and Internet of Things (IoT) platform 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, blockchain ledger system 116, IoT platform 118, and other computing devices (not shown) within distributed data processing environment 100. Distributed data processing environment 100 may be implemented in computing environment 300 shown in FIG. 3.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 110, blockchain ledger system 116, IoT platform 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes traffic management system 106 and database 108. Server computer 104 may include internal and external hardware components, as depicted and described in further detail with respect to computer 301 of FIG. 3.

Traffic management system 106 employs a smart contract on a blockchain ledger to establish rules for autonomous vehicles regarding a required distance between the vehicles and communicates the rules, and any exceptions to the rules, to each autonomous vehicle based on a unique identifier of each vehicle. Traffic management system 106 retrieves an identification of an autonomous vehicle. Traffic management system 106 retrieves a distance rule corresponding to the vehicle from a smart contract. Traffic management system 106 determines contextual information associated with the vehicle, and based on the contextual information, traffic management system 106 determines whether a distance rule exception is required. Traffic management system 106 determines a condition of the vehicle, and based on the condition of the vehicle, traffic management system 106 determines whether a distance rule exception is required. Traffic management system 106 determines a health condition of one or more passengers of the vehicle, and based on the health condition, traffic management system 106 determines whether a distance rule exception is required. If traffic management system 106 determines contextual information and/or a vehicle condition and/or a passenger health condition for which a distance rule exception is required, then traffic management system 106 generates a rule exception and stores the exception in the blockchain. Traffic management system 106 communicates the distance rule and rule exceptions, if any, to other vehicles. Traffic management system 106 is depicted and described in further detail with respect to FIG. 2.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of autonomous vehicle traffic management. These embodiments may also include periodic reminders of such recording and monitoring throughout the course of any such use. Certain embodiments may also include regular (e.g., daily, weekly, monthly) reminders to the participating parties that they have consented to being recorded and monitored for autonomous vehicle traffic management and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

In the depicted embodiment, database 108 resides on server computer 104. In another embodiment, database 108 may reside elsewhere within distributed data processing environment 100, provided that traffic management system 106 has access to database 108, via network 102. A database is an organized collection of data. Database 108 can be implemented with any type of storage device capable of storing data and configuration files that can be accessed and utilized by traffic management system 106 such as a database server, a hard disk drive, or a flash memory. Database 108 stores information used by and generated by traffic management system 106. Database 108 stores a unique identifier associated with each autonomous vehicle. For example, the unique identifier may be a value and/or code that uniquely identifies the vehicle. Database 108 may also store historical information associated with each vehicle, such as incidents and/or accidents experienced by the vehicles. Database 108 may also store location specific information associated with vehicles traveling in the area, such as any applicable traffic laws or road construction in progress. Database 108 also stores data generated by sensor $114_{1-N}$ and sensor $120_{1-N}$.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Traffic management system 106 enables the authorized and secure processing of personal data. Traffic management system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Traffic management system 106 provides information regarding personal data and the nature (e.g., type, scope, purpose, duration, etc.) of the processing. Traffic management system 106 provides the user with copies of stored personal data. Traffic management system 106 allows the correction or completion of incorrect or incomplete personal data. Traffic management system 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 110 may be integrated into a vehicle. For example, client computing device 110 may be a heads-up display in the windshield of the vehicle. In an embodiment where client computing device 110 is integrated into the vehicle, client computing device 110 includes a programmable, embedded Subscriber Identity Module (eSIM) card (not shown) that includes a unique identifier of the vehicle in addition to other vehicle information. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112 and sensor $114_{1-N}$.

User interface 112 provides an interface between traffic management system 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 112 enables a user of client computing device 110 to input data to be used by traffic management system 106, such as a vehicle ID or other vehicle information. In an embodiment, user interface 112 enables a user of client computing device 110 to share health conditions with traffic management system 106.

Blockchain ledger system 116 is one or more of a plurality of systems known in the art which can be used to store records of digital value, for example, transactions, identities, assets, documents, and properties, into an immutable ledger, or to add self-enforcing business logic to the ledger, such as smart contracts. The term "smart contract" refers to a digital entity that defines complex transaction logic and facilitates cross-organizational workflow including, but not limited to, storage of data, data access permissions, ordered workflow, and computation. In one embodiment, blockchain ledger system 116 is permissionless, i.e., a public blockchain system open for participation to anyone. In another embodiment, blockchain ledger system 116 is permissioned, i.e., a private blockchain system available only to a closed group of participants. In the depicted embodiment, blockchain ledger system 116 resides outside of server computer 104. In another embodiment, blockchain ledger system 116 may reside on server computer 104 or elsewhere within distributed data processing environment 100, provided traffic management system 106 has access to blockchain ledger system 116.

In an embodiment, blockchain ledger system 116 includes a smart contract associated with each autonomous vehicle. The smart contract includes a distance rule for the associated vehicle, i.e., a rule for a minimum distance that other vehicles must maintain with respect to the vehicle associated with the smart contract. The minimum distance may apply to each side of the vehicle, or there may be a different rule for each side of the vehicle. In an embodiment, a local authority or traffic administrator defines the distance rules.

IoT platform 118 is a suite of components that enable a) deployment of applications that monitor, manage, and control connected devices and sensors; b) remote data collection from connected devices; and c) independent and secure connectivity between devices. The suite of components may include, but are not limited to, a hardware architecture, an operating system, a runtime library, an edge device, and/or a containerized workload (not shown). In the depicted embodiment, IoT platform 118 includes sensor 120$_{1-N}$. In another embodiment, IoT platform 118 may include a plurality of other computing devices.

A sensor is a device that detects or measures a physical property and then records or otherwise responds to that property, such as vibration, chemicals, radio frequencies, environment, weather, humidity, light, etc. Sensor 114$_{1-N}$ and sensor 120$_{1-N}$, herein sensor(s) 114 and sensor(s) 120, detect a plurality of attributes of client computing device 110 and IoT platform 118, respectively. As used herein, N represents a positive integer, and accordingly the number of scenarios implemented in a given embodiment of the present invention is not limited to those depicted in FIG. 1. In an embodiment, sensor(s) 114 and sensor(s) 120 detect a plurality of attributes of the autonomous vehicle, one or more passengers (i.e., users) of the vehicle, and the environment surrounding the vehicle. Sensor(s) 114 and sensor(s) 120 may be one or more of a plurality of types of cameras, including, but not limited to, pinhole, stereo, omni-directional, non-central, infrared, video, digital, three dimensional, panoramic, filter-based, wide-field, narrow-field, telescopic, microscopic, etc. In some embodiments, sensor(s) 114 and sensor(s) 120 include any device capable of imaging a portion of the electromagnetic spectrum. Sensor(s) 114 and sensor(s) 120 may be one or more of a plurality of types of microphones for detecting speech and other audible sounds. Sensor(s) 114 and sensor(s) 120 may be able to detect weather conditions, such as air temperature, relative humidity, presence and type of precipitation, wind speed, etc. Sensor(s) 114 and sensor(s) 120 may be global positioning system (GPS) sensors. For example, sensor(s) 114 may use GPS to detect the location of the user of client computing device 110. Sensor(s) 114 and sensor(s) 120 may include various types of pressure sensors and/or strain gauges to detect a person sitting or standing in a particular location. Sensor(s) 114 and sensor(s) 120 may include various types of accelerometers to detect movement or vibration of client computing device 110 and/or a component included in IoT platform 118. Sensor(s) 114 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, eye tracking data, etc. In an embodiment where client computing device 110 is integrated into the autonomous vehicle, sensor(s) 114 may include one or more types of sensors associated with the autonomous vehicle. For example, sensor(s) 114 may include a fuel level sensor, a fuel temperature sensor, an oil level sensor, a water level sensor, an oxygen sensor, an engine speed sensor, a Mass Air Flow (MAF) sensor, a Manifold Absolute Pressure (MAP) sensor, a crankshaft sensor, etc. In one embodiment, sensor(s) 114 and sensor(s) 120 transmit data directly to database 108.

Figure 2:
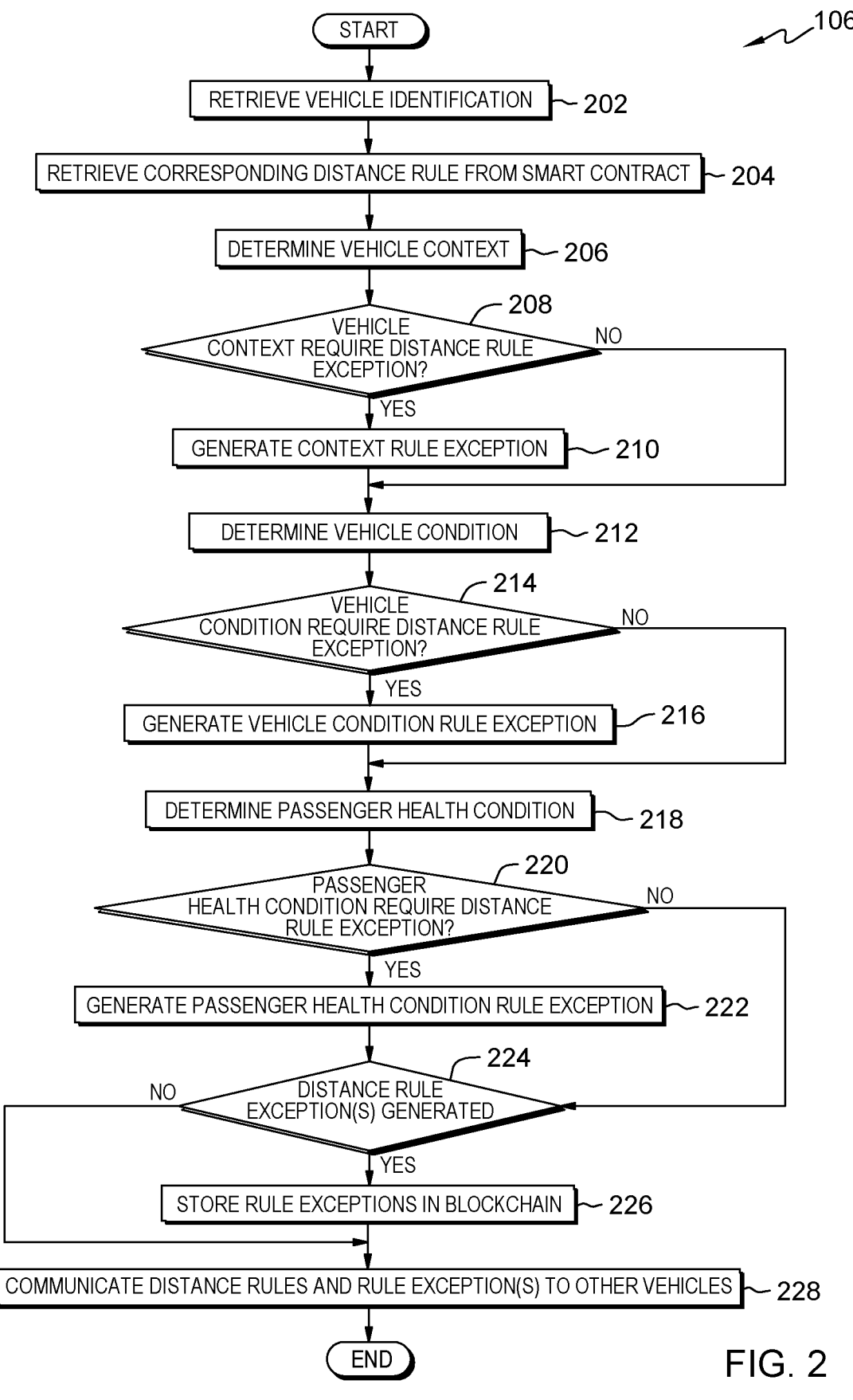
FIG. 2 is a flowchart depicting operational steps of a traffic management system, on a server computer within the distributed data processing environment of FIG. 1, for autonomous vehicle traffic management, in accordance with an embodiment of the present invention.

FIG. 2 is a flowchart depicting operational steps of traffic management system 106, on server computer 104 within distributed data processing environment 100 of FIG. 1, for autonomous vehicle traffic management, in accordance with an embodiment of the present invention.

Traffic management system 106 retrieves an identification of an autonomous vehicle (step 202). In an embodiment, each autonomous vehicle has a corresponding unique identifier (ID) stored in database 108. In an embodiment, the unique ID is also, or alternatively, stored in a smart contract associated with the vehicle in blockchain ledger system 116. In an embodiment, traffic management system 106 retrieves the unique ID of a first autonomous vehicle from the associated storage location. In a further embodiment, traffic management system 106 retrieves the unique ID from an eSIM card associated with the vehicle. In another embodiment, traffic management system 106 transmits a request for the vehicle ID to client computing device 110, via user interface 112, and when client computing device 110, or the user of client computing device 110, responds with the unique ID, then traffic management system 106 receives the identification of the first autonomous vehicle.

Traffic management system 106 retrieves a distance rule corresponding to the vehicle from a smart contract (step 204). In an embodiment, a local authority or traffic administrator pre-defines distance rules and corresponding exceptions and stores them in blockchain ledger system 116 in a smart contract. In an embodiment, based on the unique ID of the first autonomous vehicle, traffic management system 106 retrieves a corresponding distance rule from the smart contract associated with the vehicle. In an embodiment, the retrieved distance rule defines the minimum distance that other vehicles driving in proximity to the first autonomous vehicle must maintain with respect to one or more sides of the vehicle.

Traffic management system 106 determines contextual information associated with the vehicle (step 206). In an embodiment, traffic management system 106 retrieves and/or receives various types of data to determine any contextual information and/or scenarios associated with the first autonomous vehicle and/or the environment in which the vehicle is traveling that may influence the distance rule retrieved from the smart contract. For example, traffic management system 106 may retrieve location specific information stored in database 108, such as any applicable traffic laws or information associated with road construction in progress. In another example, traffic management system 106 may receive data from one or more of sensor(s) 120 that indicate weather conditions and/or road conditions, such as fog in the area or ice on the road.

Based on the contextual information, traffic management system 106 determines whether a distance rule exception is required (decision block 208). Different distance rule exceptions may be associated with different types of autonomous vehicles. For example, in a snowstorm, a snowplow will have an exception to a common distance rule that keeps the snowplow further away from other vehicles. In another example, a school bus will have an associated distance rule exception when the red lights on the school bus are flashing that indicates other vehicles must not pass the school bus. In an embodiment, traffic management system 106 analyzes the contextual information associated with the first autonomous vehicle to determine whether any of the retrieved/received data may influence the current distance rule such that an exception to the distance rule is required. For example, if there is ice on the road, then traffic management system 106 determines that the minimum distance that other vehicles must maintain for safe driving is longer than the current distance rule.

If traffic management system 106 determines a distance rule exception is required ("yes" branch, decision block 208), then traffic management system 106 generates a context rule exception (step 210). In an embodiment, if traffic management system 106 determines the contextual information influences the current distance rule, then traffic management system 106 generates an exception to the distance rule based on the contextual information. Continuing the previous example, if the current distance rule is that other vehicles must maintain a minimum distance of one car-length behind the first autonomous vehicle, but traffic management system 106 detects ice on the road, then traffic management system 106 generates an exception to the current distance rule that requires the other vehicles to maintain a two car-length distance behind the first autonomous vehicle.

Responsive to generating a context rule exception, or if traffic management system 106 determines a distance rule exception is not required ("no" branch, decision block 208), then traffic management system 106 determines a condition of the vehicle (step 212). In an embodiment, traffic management system 106 retrieves various types of data from database 108 to determine the condition of the first autonomous vehicle that may influence the distance rule retrieved from the smart contract. In another embodiment, traffic management system 106 receives various types of data from sensor(s) 114 and/or sensor(s) 120 to determine a condition of the first autonomous vehicle that may influence the distance rule retrieved from the smart contract. For example, in an embodiment where client computing device 110 is integrated into the first autonomous vehicle, traffic management system 106 may receive data from one or more of sensor(s) 114 that are associated with the condition of the vehicle. In an embodiment, traffic management system 106 retrieves data from a digital twin of the first autonomous vehicle. The digital twin can simulate the state of the vehicle, such that conditions such as component wear can be detected prior to failure.

Based on the vehicle condition, traffic management system 106 determines whether a distance rule exception is required (decision block 214). In an embodiment, traffic management system 106 analyzes the vehicle condition information associated with the first autonomous vehicle to determine whether any of the retrieved/received data may influence the current distance rule such that an exception to the distance rule is required. For example, if the first autonomous vehicle is a large truck and traffic management system 106 determines that the truck is giving off a significant amount of exhaust, then traffic management system 106 determines that the minimum distance that other vehicles must maintain for safe driving is longer than the current distance rule.

If traffic management system 106 determines a distance rule exception is required ("yes" branch, decision block 214), then traffic management system 106 generates a vehicle condition rule exception (step 216). In an embodiment, if traffic management system 106 determines the vehicle condition information influences the current distance rule, then traffic management system 106 generates an exception to the distance rule based on the vehicle condition information. Continuing the previous example, if the current distance rule is that other vehicles must maintain a minimum distance of one car-length behind the first autonomous vehicle, but traffic management system 106 detects smoke being emitted from the exhaust system of the first autonomous vehicle, then traffic management system 106 generates an exception to the current distance rule that requires the other vehicles to maintain a two car-length distance behind the vehicle.

Responsive to generating a vehicle condition rule exception, or if traffic management system 106 determines a vehicle condition rule exception is not required ("no"

branch, decision block 214), then traffic management system 106 determines a health condition of a passenger (step 218). In an embodiment, traffic management system 106 retrieves various types of data from database 108 to determine the health condition of one or more passengers in the first autonomous vehicle that may influence the distance rule retrieved from the smart contract. In another embodiment, traffic management system 106 receives various types of data from sensor(s) 114 and/or sensor(s) 120 to determine the health condition of one or more passengers of the first autonomous vehicle that may influence the distance rule retrieved from the smart contract. For example, in an embodiment where client computing device 110 is a user monitor/fitness device, traffic management system 106 may receive data from one or more of sensor(s) 114 that are associated with the health of the user, such as an elevated heart rate. In another example, traffic management system 106 may receive an image of a passenger from one or more of sensor(s) 120 and uses image recognition technology to determine that the user has dilated pupils. In yet another embodiment, traffic management system 106 may determine that the first autonomous vehicle is an ambulance based on the unique ID associated with the vehicle, and traffic management system 106 receives audio data and determines that the ambulance siren is activated using sound recognition technology.

In another embodiment, traffic management system 106 may identify the one or more passengers in the first autonomous vehicle. For example, traffic management system 106 may use one or more of facial recognition techniques and/or biometric information extracted from client computing device 110 to identify the one or more passengers. In a further embodiment, traffic management system 106 may access one or more applications on client computing device 110 that may indicate where the passenger is headed. For example, traffic management system 106 may access a ride share application or a calendar application that indicates the user is on the way to a doctor appointment.

Based on the passenger health condition, traffic management system 106 determines whether a distance rule exception is required (decision block 220). In an embodiment, traffic management system 106 analyzes the passenger health condition information associated with the first autonomous vehicle to determine whether any of the retrieved/received data may influence the current distance rule such that an exception to the distance rule is required. For example, if the first autonomous vehicle is an ambulance and traffic management system 106 determines that the ambulance siren is activated, then traffic management system 106 determines that the minimum distance that other vehicles must maintain to enable the ambulance to pass quickly is different than the current distance rule.

If traffic management system 106 determines a distance rule exception is required ("yes" branch, decision block 220), then traffic management system 106 generates a passenger health condition rule exception (step 222). In an embodiment, if traffic management system 106 determines the passenger health condition information influences the current distance rule, then traffic management system 106 generates an exception to the distance rule based on the passenger health condition information. Continuing the previous example, if the current distance rule is that other vehicles must maintain a minimum distance of one car-length behind the first autonomous vehicle, but the first autonomous vehicle is an ambulance, and traffic management system 106 detects the ambulance siren is activated, then traffic management system 106 generates an exception to the current distance rule that requires the other vehicles to pull over to the side of the road until the ambulance passes the other vehicles.

Responsive to generating a passenger health condition rule exception, or if traffic management system 106 determines a passenger health condition rule exception is not required ("no" branch, decision block 220), then traffic management system 106 determines whether any distance rule exceptions were generated (decision block 224). In an embodiment, traffic management system 106 determines whether traffic management system 106 generated any distance rule exceptions in step 210 and/or step 216 and/or step 222 based on the various retrieved and/or received data.

If traffic management system 106 determines a distance rule exception was generated ("yes" branch, decision block 224), then traffic management system 106 stores the distance rule exception in the blockchain (step 226). In an embodiment, traffic management system 106 stores any distance rule exceptions associated with the first autonomous vehicle in blockchain ledger system 116 in the smart contract associated with the first autonomous vehicle. In an embodiment, traffic management system 106 includes a machine learning model that dynamically updates a distance rule and/or an exception based on historical learning. For example, if the first autonomous vehicle is involved in an accident with another vehicle, even though the associated distance rule was being followed by the other vehicles traveling in proximity to the first autonomous vehicle, then traffic management system 106 dynamically updates the corresponding distance rule based on the vehicle type and/or the detected conditions at the time of the accident, such that the distance rule evolves and is increased to a larger minimum distance between the first autonomous vehicle and the other vehicles.

Responsive to storing the distance rule exception in the blockchain, or if traffic management system 106 determines no rule exceptions were generated ("no" branch, decision block 224), then traffic management system 106 communicates the distance rule and rule exceptions, if any, to other vehicles (step 228). In an embodiment, as the first autonomous vehicle travels through an area, traffic management system 106 transmits the distance rules and any exceptions to the distance rules associated with the first autonomous vehicle to other autonomous vehicles traveling in proximity to the first autonomous vehicle such that traffic management system 106 ensures that the other autonomous vehicles drive themselves according to the rules while traveling. In an embodiment, traffic management system 106 determines whether another autonomous vehicle is within a threshold distance of the first autonomous vehicle, and if traffic management system 106 determines the other autonomous vehicle is within a threshold distance, then traffic management system 106 transmits the distance rule and any exceptions to the other autonomous vehicle.

Figure 3:
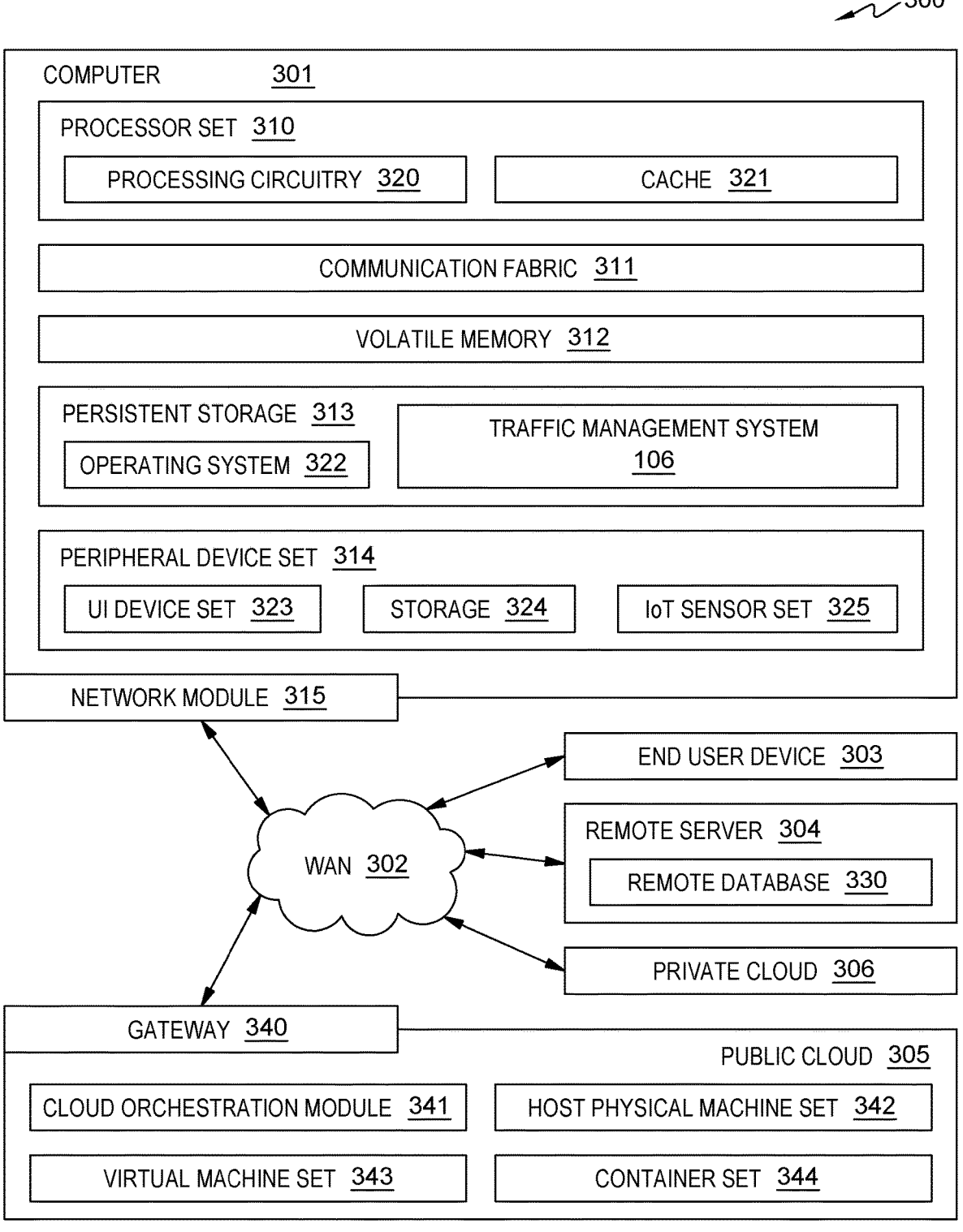
FIG. 3 illustrates an exemplary computer environment in which aspects of one or more of the illustrative embodiments may be implemented, and at least some of the computer code involved in performing the inventive methods may be executed, in accordance with an embodiment of the present invention.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as traffic management system 106 for autonomous vehicle traffic management. In addition to traffic management system 106, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and traffic management system 106, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in traffic management system 106 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in traffic management system 106 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

retrieving, by one or more computer processors, a distance rule corresponding to a first autonomous vehicle from a smart contract, wherein the distance rule is a rule for a minimum distance that a second autonomous vehicle must maintain when traveling in proximity to the first autonomous vehicle;

determining, by one or more computer processors, based on detected emissions from an exhaust system of the first autonomous vehicle, that a first exception to the distance rule is required, wherein the first exception to the distance rule increases the minimum distance that the second autonomous vehicle must maintain behind the first autonomous vehicle from one car-length to two car-lengths; and communicating, by one or more computer processors, the distance rule and the first exception to the distance rule to the second autonomous vehicle in response to determining that the second autonomous vehicle is within a threshold distance of the first autonomous vehicle, wherein the communication causes the second autonomous vehicle to drive itself according to the first exception to the distance rule corresponding to the first autonomous vehicle.

2. The computer-implemented method of claim 1, further comprising:

determining, by one or more computer processors, a context of the first autonomous vehicle;

based on the context of the first autonomous vehicle, determining, by one or more computer processors, that a second exception to the distance rule is required, wherein the second exception to the distance rule increases the minimum distance that the second autonomous vehicle must maintain behind the first autonomous vehicle; and communicating, by one or more computer processors, the second exception to the distance rule to the second autonomous vehicle.

3. The computer-implemented method of claim 2, wherein:

the context of the first autonomous vehicle includes location specific information associated with the first autonomous vehicle, the location specific information including at least one of weather conditions or road conditions received from one or more sensors integrated into the first autonomous vehicle, and determining, based on the location specific information of the first autonomous vehicle, that the first exception to the distance rule is required.

4. The computer-implemented method of claim 2, wherein:

the context of the first autonomous vehicle includes location specific information associated with the first autonomous vehicle, the location specific information including at least one of applicable traffic laws or road construction information associated with a location the first autonomous vehicle, and determining, based on the location specific information of the first autonomous vehicle, that the first exception to the distance rule is required.

5. The computer-implemented method of claim 1, further comprising:

determining, by one or more computer processors, a health condition of a passenger of the first autonomous vehicle;

based on the health condition of the passenger of the first autonomous vehicle, determining, by one or more computer processors, that a second exception to the distance rule is required, wherein the second exception to the distance rule increases the minimum distance that the second autonomous vehicle must maintain behind the first autonomous vehicle; and communicating, by one or more computer processors, the second exception to the distance rule to the second autonomous vehicle.

6. The computer-implemented method of claim 1, further comprising:

storing, by one or more computer processors, the first exception to the distance rule in association with the smart contract.

7. The computer-implemented method of claim 1, further comprising:

determining, by one or more computer processors, one or more historical accidents experienced by the first autonomous vehicle; and dynamically updating, by one or more computer processors, the first exception to the distance rule based on vehicle type and detected conditions associated with the first autonomous vehicle at a time of the one or more historical accidents.

8. The computer-implemented method of claim 1, wherein the distance rule and the first exception to the distance rule are communicated to the second autonomous vehicle based on a unique identifier of the second vehicle.

9. The computer-implemented method of claim 1, further comprising:

determining, by one or more computer processors, based on detecting ice on a road that the first autonomous vehicle is travelling along, that a second exception to the distance rule is required, wherein the second exception to the distance rule increases the minimum distance that the second autonomous vehicle must maintain behind the first autonomous vehicle.

10. The computer-implemented method of claim 9, wherein the second exception to the distance rule increases the minimum distance that the second autonomous vehicle must maintain behind the first autonomous vehicle from one car-length to two car-lengths.

11. A computer program product comprising:

one or more computer-readable storage media;

program instructions stored on at least one of the one or more computer-readable storage media, to retrieve a distance rule corresponding to a first autonomous vehicle from a smart contract, wherein the distance rule is a rule for a minimum distance that a second autonomous vehicle must maintain when travelling in proximity to the first autonomous vehicle;

program instructions, stored on at least one of the one or more computer-readable storage media, to determine, based on detected emissions from an exhaust system of the first autonomous vehicle, that a first exception to the distance rule is required, wherein the first exception to the distance rule increases the minimum distance that the second autonomous vehicle must maintain behind the first autonomous vehicle from one car-length to two car-lengths; and program instructions, stored on at least one of the one or more computer-readable storage media, to communicate the distance rule and the first exception to the distance rule to the second autonomous vehicle in response to determining that the second autonomous vehicle is within a threshold distance of the first autonomous vehicle, wherein the communication causes the second autonomous vehicle to drive itself according to the first exception to the distance rule corresponding to the first autonomous vehicle.

12. The computer program product of claim 11, further comprising:

program instructions, stored on at least one of the one or more storage media, to determine a context of the first autonomous vehicle;

based on the context of the first autonomous vehicle, program instructions, stored on at least one of the one or more storage media, to determine that a second exception to the distance rule is required, wherein the second exception to the distance rule increases the minimum distance that the second autonomous vehicle must maintain behind the first autonomous vehicle; and program instructions, stored on at least one of the one or more storage media, to communicate the second exception to the distance rule to the second autonomous vehicle.

13. The computer program product of claim 11, further comprising:

program instructions, stored on at least one of the one or more storage media, to determine a health condition of a passenger of the first autonomous vehicle;

based on the health condition of the passenger of the first autonomous vehicle, program instructions, stored on at least one of the one or more storage media, to determine that a second exception to the distance rule is required, wherein the second exception to the distance rule increases the minimum distance that the second autonomous vehicle must maintain behind the first autonomous vehicle; and program instructions, stored on at least one of the one or more storage media, to communicate the second exception to the distance rule to the second autonomous vehicle.

14. The computer program product of claim 11, further comprising:

program instructions, stored on at least one of the one or more storage media, to determine one or more historical accidents experienced by the first autonomous vehicle; and program instructions, stored on at least one of the one or more storage media, to dynamically update the first exception to the distance rule based on vehicle type and detected conditions associated with the first autonomous vehicle at a time of the one or more historical accidents.

15. A computer system comprising:

one or more computer processors;

one or more computer-readable memories; and one or more computer-readable storage media;

program instructions, stored on at least one of the one or more computer-readable storage media for execution by at least one of the one or more computer processors via at least one of the one or more memories, to retrieve a distance rule corresponding to a first autonomous vehicle from a smart contract, wherein the distance rule is a rule for a minimum distance that a second autonomous vehicle must maintain when travelling in proximity to the first autonomous vehicle;

program instructions, stored on the one or more computer-readable storage media for execution by at least one of the one or more computer processors via at least one of the one or more memories, to determine, based on detected emissions from an exhaust system of the first autonomous vehicle, that a first exception to the distance rule is required, wherein the first exception to the distance rule increases the minimum distance that the second autonomous vehicle must maintain behind the first autonomous vehicle from one car-length to two car-lengths; and program instructions, stored on the one or more computer-readable storage media for execution by at least one of the one or more computer processors via at least one of the one or more memories, to communicate the distance rule and the first exception to the distance rule to the second autonomous vehicle in response to determining that the second autonomous vehicle is within a threshold distance of the first autonomous vehicle, wherein the communication causes the second autonomous vehicle to drive itself according to the first exception to the distance rule corresponding to the first autonomous vehicle.

16. The computer system of claim 15, further comprising:

program instructions, stored on the one or more computer-readable storage media for execution by at least one of the one or more computer processors via at least one of the one or more memories, to determine a context of the first autonomous vehicle;

based on the context of the first autonomous vehicle, program instructions, stored on the one or more computer-readable storage media for execution by at least one of the one or more computer processors via at least one of the one or more memories, to determine that a second exception to the distance rule is required, wherein the second exception to the distance rule increases the minimum distance that the second autonomous vehicle must maintain behind the first autonomous vehicle; and program instructions, stored on the one or more computer-readable storage media for execution by at least one of the one or more computer processors via at least one of the one or more memories, to communicate the second exception to the distance rule to the second autonomous vehicle.

17. The computer system of claim 15, further comprising:

program instructions, stored on the one or more computer-readable storage media for execution by at least one of the one or more computer processors via at least one of the one or more memories, to determine a health condition of a passenger of the first autonomous vehicle;

based on the health condition of the passenger of the first autonomous vehicle, program instructions, stored on the one or more computer-readable storage media for execution by at least one of the one or more computer processors via at least one of the one or more memories, to determine that a second exception to the distance rule is required, wherein the second exception to the distance rule increases the minimum distance that the second autonomous vehicle must maintain behind the first autonomous vehicle; and program instructions, stored on the one or more computer-readable storage media for execution by at least one of the one or more computer processors via at least one of the one or more memories, to communicate the second exception to the distance rule to the second autonomous vehicle.

18. The computer system of claim 15, further comprising:

program instructions, stored on the one or more computer-readable storage media for execution by at least one of the one or more computer processors via at least one of the one or more memories, to determine one or more historical accidents experienced by the first autonomous vehicle; and program instructions, stored on the one or more computer-readable storage media for execution by at least one of the one or more computer processors via at least one of the one or more memories, to dynamically update the first exception to the distance rule based on vehicle type and detected conditions associated with the first autonomous vehicle at a time of the one or more historical accidents.

* * * * *